United States Patent [19]

Ito et al.

[11] Patent Number: 4,998,195

[45] Date of Patent: Mar. 5, 1991

[54] DATA INPUT APPARATUS AND CONTROL METHOD THEREFOR

[75] Inventors: Masazumi Ito; Kimihiko Higashio, both of Osaka, Japan

[73] Assignee: Minolta Camera Kabushiki Kaisha, Osaka, Japan

[21] Appl. No.: 466,877

[22] Filed: Jan. 18, 1990

Related U.S. Application Data

[62] Division of Ser. No. 291,953, Dec. 29, 1988.

[30] Foreign Application Priority Data

| | | | |
|---|---|---|---|
| Dec. 29, 1987 | [JP] | Japan | 62-333312 |
| Dec. 29, 1987 | [JP] | Japan | 62-333313 |
| Dec. 29, 1987 | [JP] | Japan | 62-333314 |
| Dec. 29, 1987 | [JP] | Japan | 62-333315 |
| Dec. 29, 1987 | [JP] | Japan | 62-333316 |
| Apr. 1, 1988 | [JP] | Japan | 63-81608 |

[51] Int. Cl.[5] ...................... G06F 15/62; G03G 15/04

[52] U.S. Cl. .................................... 364/134; 364/185; 355/200; 355/204

[58] Field of Search ............... 364/184, 138, 191, 146, 364/188, 186, 185, 189; 235/375, 376; 355/200, 204, 206, 208

[56] References Cited

U.S. PATENT DOCUMENTS

| | | | |
|---|---|---|---|
| 4,699,501 | 10/1987 | Watanabe et al. | 355/200 |
| 4,711,560 | 12/1987 | Hosaka et al. | 355/200 |
| 4,780,806 | 10/1988 | Wada et al. | 364/146 |
| 4,797,706 | 1/1989 | Sugishima et al. | 355/14 R |
| 4,817,092 | 3/1989 | Denny | 371/11 |

*Primary Examiner*—Jerry Smith
*Assistant Examiner*—Paul Gordon
*Attorney, Agent, or Firm*—Burns, Doane, Swecker & Mathis

[57] ABSTRACT

A data input apparatus for inputting control information to a data card for controlling a machine by means of the same comprises a memory in which specification of the machine to be controlled by the card have been stored and an operation panel for inputting operation mode of the machine. If the inputted operation mode is out of the stored specification of the machine, the control information of the machine is not inputted to the data card.

10 Claims, 20 Drawing Sheets

DATA INPUT APPARATUS AND CONTROL METHOD THEREFOR

This application is a divisional of application Ser. No. 291.953, filed Dec. 29, 1988.

BACKGROUND OF THE INVENTION

1. Field of the Invention

The present invention relates to a data input apparatus for having inputted prescribed data in a memory medium (for example an IC card) and to a control method therefor. More specifically, the present invention relates to a data input apparatus for saving data for controlling other plurality of machines by using the inputted data and to the control method therefor.

2. Description of the Background Art

Control of a copying machine employing an IC (Integrated Circuit) card has been proposed. According to the proposal, desired items and the levels of these items for a copying machine (items and desired values thereof such as copy paper size; A4, copying magnification; 1.2, number of copies; 13, and so on) are stored in an IC card. By loading the said IC card into the copying machine, the desired values for respective items are collectively set in the copying machine.

In the above described proposal, the input of data to be saved in the IC card (the data of the items and the desired values for the respective items) is carried out separately from the copying machine, namely, it is carried out by means of a prescribed data input apparatus independent of the copying machine.

As described above, when inputting data to an IC card, it is difficult to know what kind of data can be inputted thereto. Namely, we cannot check what kind of items in what range are available for the copying machine to which the data saved in the card is loaded.

Consequently, sometimes the operating mode stored in the card (the operating mode is defined by the items and the levels designated for respective items) cannot be set in the copying machine.

For example, when a data "paper size; A3" is stored in an IC card and the copy paper having the size of B4 is the largest available paper for the copying machine to which the card is to be loaded, the size A3 paper cannot be set.

SUMMARY OF THE INVENTION

Therefore, one object of the present invention is to prevent input of unnecessary data, which should not be inputted, to a data input apparatus.

Another object of the present invention is to save time required for inputting control data of machine in a data inputting apparatus.

A further object of the present invention is to prevent in a data input apparatus erroneous operation of a machine derived from the control data inputted by the data input apparatus.

A still further object of the present invention is to make clear the tendency of the inputs of control data which are out of a settable range in a data input apparatus.

A still further object of the present invention is to provide a method of inputting data in which unnecessary data, which can not control the machine, are not inputted.

The above described object of the present invention can be attained by a data input apparatus for storing data for controlling a machine and for inputting the data to a memory medium which can be attached to and detached from the machine, comprising: a memory apparatus for storing capacity of the machine to which the memory medium is attached and for storing desired control data; an input apparatus for inputting the capacity of the machine and the desired control data to the memory apparatus; a determining apparatus for determining whether the machine can be operated based on the desired control data or not; and a recording apparatus for recording, when it is determined that the machine can be operated, the desired control data on the memory medium.

Since the data input apparatus comprises the above described components, control data which is beyond the capacity of the machine is not recorded to the memory medium. Therefore, unnecessary data which should not be recorded is not recorded in the memory medium.

In a preferred embodiment of the present invention, the input apparatus further comprises warning apparatus for giving a warning when the machine can not be operated based on the desired control data.

Since the data input apparatus comprises the above described components, a warning is given when the desired control data is beyond the capacity of the machine. Consequently, the erroneous operations of the machine can be prevented in the data input apparatus.

In a more preferred embodiment of the present invention, provided is a data input apparatus for storing data for controlling machines and for inputting the data on a memory medium which can be attached to and detached from a plurality of types of the machines, comprising: a memory apparatus for storing capacity of the machines to which said memory medium is attached and for storing desired control data; an inputting apparatus for inputting capacities of the plurality of machines and the desired control data; a display apparatus, when any one of the machines is capable of operating based on the desired control data, for displaying the machine; and a recording apparatus for recording said desired control data on the memory medium.

Since the data input apparatus comprises the above described component, when desired control data are inputted, a machine capable of responding the data is displayed. Consequently, there is no need of searching an available machine, and there is no possibility of using improper machine.

In accordance with a more preferred embodiment of the present invention, provided is a data input apparatus for storing data for controlling machines and for inputting the data to a memory medium which can be attached to and detached from a plurality of types of the machines, wherein the machines operate under conditions set for a plurality of items, and a value in a prescribed range can be selected for each of the items, the machine comprising: a memory apparatus for storing the prescribed range for each of the items of the machines; an inputting apparatus for inputting a desired condition for each of the items; a determining means for determining whether the desired condition is in the prescribed range or not for each of the items; a plurality of counting apparatus for each corresponding to each of the items, for counting, when the desired condition exceeds the prescribed range of each of the items, the number of such excess; and a display apparatus for displaying the counted values in the plurality of the counting apparatus.

Since the data input apparatus comprises the above described components, the number of inputs of control data beyond the capacity of the machines is counted and displayed. Therefore, the tendency of the inputs of the control data out of the settable range can be made clear in the data inputting apparatus.

In accordance with a more preferred embodiment of the present invention, a method for controlling a data input apparatus for storing data for controlling machine and for inputting the data to a memory medium which can be attached to and detached from the said machine comprises the following steps of: inputting capacity of the machine to which the said memory medium is attached; inputting desired control data; determining whether the machine is operable based on the desired control data; and recording the desired control data on a memory medium when the machine is operable.

Since the method for controlling the data input apparatus comprises the above described steps, the control data are recorded on a recording medium only when the desired control data is not beyond the capacity of the machine. Consequently, a data input apparatus can be provided in which unnecessary data, which cannot control the machine, are not inputted.

The foregoing and other objects, features, aspects and advantages of the present invention will become more apparent from the following detailed description of the present invention when taken in conjunction with the accompanying drawings.

DESCRIPTION OF THE PREFERRED EMBODIMENT

Embodiments of the present invention will be described in the following.

(1) Overview

Figure 1:
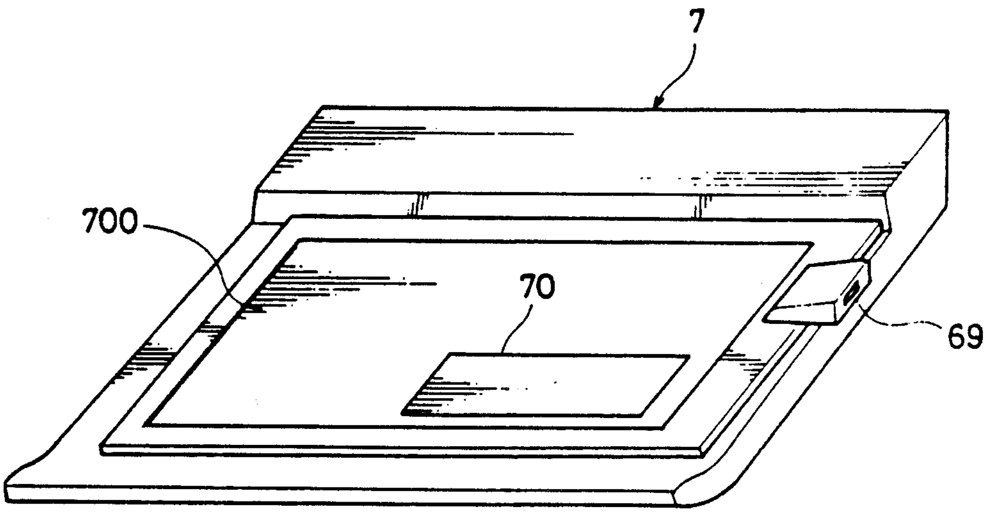
FIG. 1 is a perspective view showing the appearance of a data input apparatus in accordance with one embodiment.

FIG. 1 is a perspective view showing an appearance of the data input apparatus in accordance with one embodiment of the present invention.

As shown in the figure, the data input apparatus 7 comprises a panel 700 for inputting position coordinate data of a desired point by pressing the said desired point in edition copying; an operating portion 70 arranged at a right corner of the panel 700; and a portion 69 provided in the right as viewed of the body of the apparatus 7 for receiving an IC card.

(2) Description of the Whole System

Figure 2:
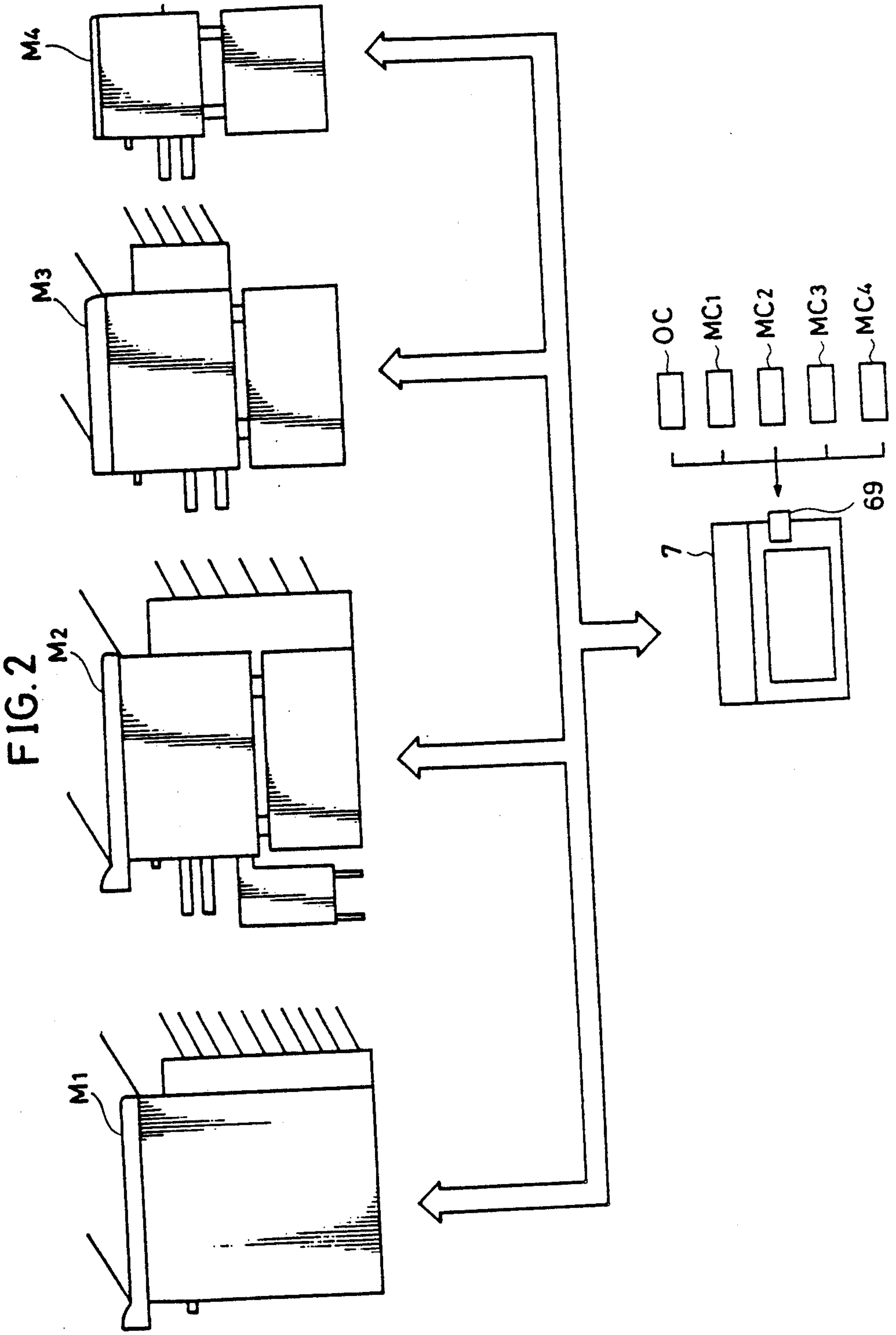
FIG. 2 illustrates the whole system of the embodiment.

FIG. 2 shows a system structure for controlling a plurality of, for example four, copying machines $M_1$ to $M_4$ by means of the data input apparatus 7. IC cards (machine registration cards) $MC_1$ to $MC_4$ are prepared for respective copying machines $M_1$ to $M_4$, in which respective machine specifications are stored. In the machine registration card $MC_1$, the maximum number of copies of 999, the largest possible paper size of A3, the range of copying magnification from 50% to 200%, and so on are stored as the machine specifications of the copying machine $M_1$. Each of the machine registration cards $MC_1$ to $MC_4$ is inserted into the IC card receiving portion 69 of the data input apparatus, whereby the machine specifications of the copying machines $M_1$ to $M_4$ are stored in the data input apparatus.

Meanwhile, an operator card OC is prepared, which is an IC card capable of storing copying conditions desired by the operator. A plurality of operator cards OC are prepared, the number of which corresponding to the number of operators. The operator card OC is inserted into the IC card receiving portion 69 of the data input apparatus 7, whereby the copying conditions desired by the operator are stored.

Further, the data input apparatus has a function of displaying a copying machine capable of copying under the conditions desired by the operator based on the machine specification data which have been stored.

An operator applies the operator card OC storing the copying conditions to that copying machine which was designated by the data input apparatus. The copying apparatus on which the operator card OC is applied carries out copying operation under the conditions stored in the operator card OC.

(3) First Embodiment (Description of the Operation Panel)

Figure 3:
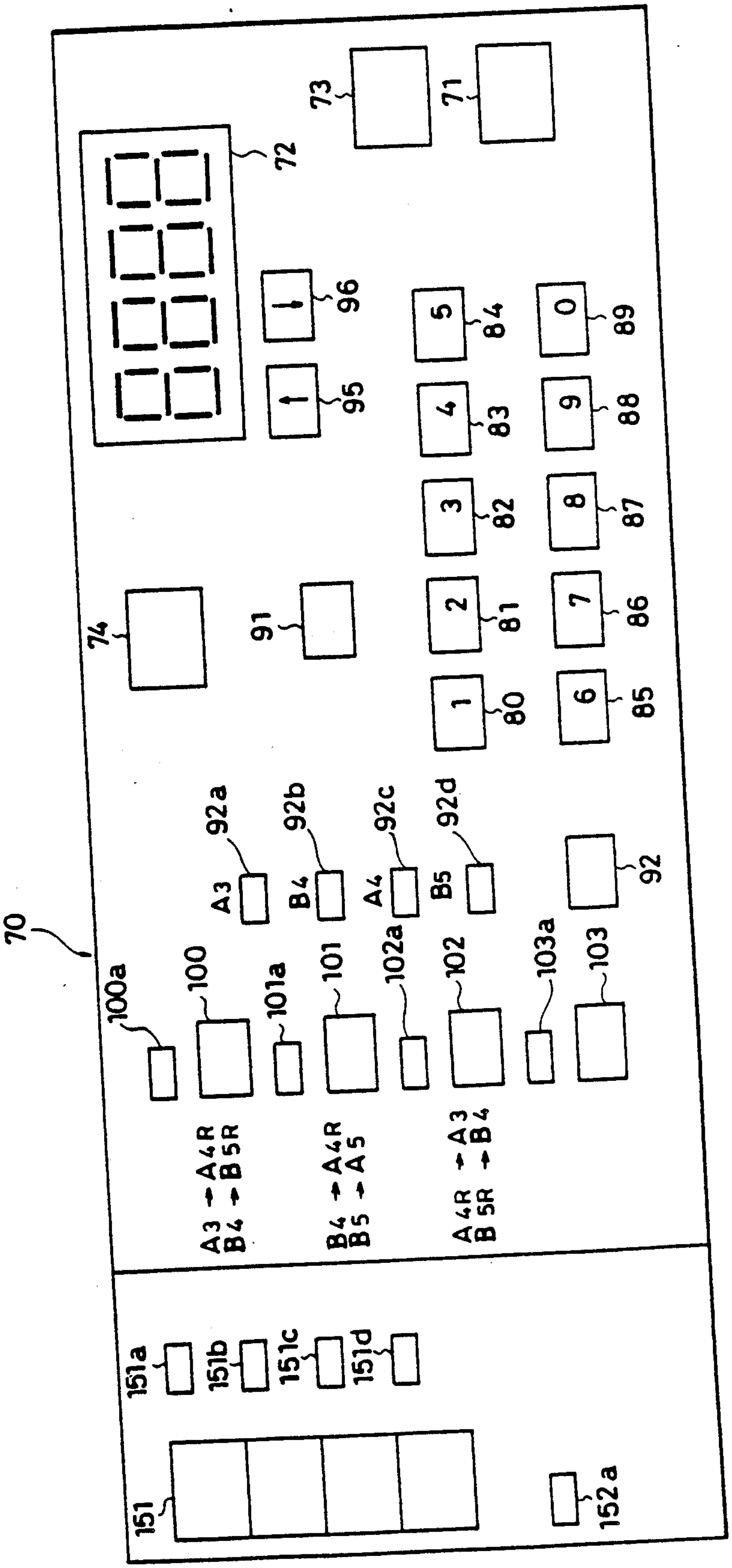
FIG. 3 illustrates an operation panel of the said data input apparatus.

FIG. 3 shows details of the said operation panel 70. As is shown in the figure, on the operation panel 70 arranged are: a ten key group 80 to 89 for inputting numerical data; a copy paper select key 92 for successively selecting a size of copy papers (A3, B4, A4, B5); display LEDs 92*a* to 92*d* for displaying the selected copy paper size; fixed magnification keys 100 to 103 for selecting a prescribed copying magnification whose value has been previously determined (fixed magnification: 0.707, 0.816, 1.414, 1.000); display LEDs 100*a* to 103*a* for displaying the selected fixed magnification; a magnification up key 95 and a magnification down key 96 for setting arbitrary magnification; a space 151 to which the copying machine to be controlled is written; display LEDs 151*a* to 151*d* for displaying a copying machine available under the set conditions; a warning display LED 152*a* for giving a warning when no copying machine is available under the set conditions; a clear key 91 for clearing inputted data; a data store key 71 for instructing data writing (save) into an operator card set in the card receiving portion 69; a data load key 73 for instructing data reading (load) from the set machine registration card; a count display request key 74 for requesting a display of the number of erroneous setting; and a numeral display portion 72 of four digits for displaying the number of copies, the copying magnification or the prescribed number of erroneous setting.

(Description of the Control Portion)

Figure 4:
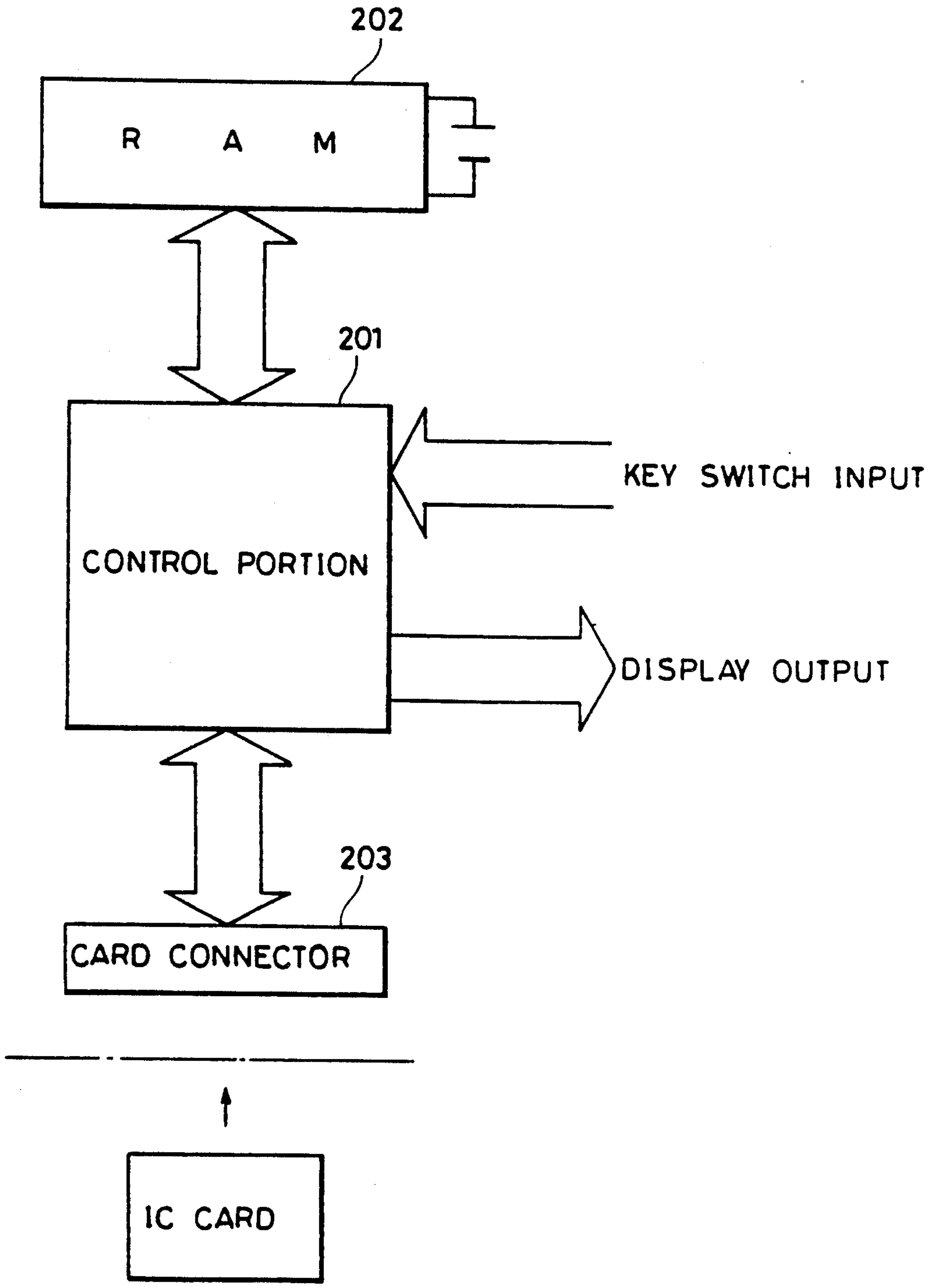
FIG. 4 is block diagram of a control circuit of the said data input apparatus.

FIG. 4 is a block diagram showing the control portion of the data input apparatus.

The control portion 201 mainly formed of a control CPU is connected by means of buses to a card connector 203 and to a RAM 202 which is backed up by a battery.

When the IC card is inserted into the card receiving portion 69, the card connector 203 is connected to that IC card, thereby enabling loading of data from the IC card or saving of the data to the IC card.

To the control portion 201 inputted are signals from various key switches shown in FIG. 3 (the ten key group 80 to 89, the fixed magnification keys 100 to 103, the copy paper select key 92, the clear key 91, the magnification up key 95, the magnification down key 96, the data store key 71, the data load key 73, the count display requesting key 74). From the control portion 201 outputted are control signals to the driving circuits of respective displaying elements (the segment numeral displaying portion 72, the copy paper size display LEDs 92*a* to 92*d*, the magnification display LEDs 100*a* to 103*a*, the machine display LEDs 151*a* to 151*d*, and the warning display LED 152*a*).

(Description of the Operation)

The processing in the control CPU of the apparatus in accordance with the present embodiment will be described in the following.

Prior to the description of the flow chart, the terms "ON edge" and "OFF edge" are defined.

When a state of a switch, a sensor, a signal or the like changes from the off state to the on state, the change of the state is defined as the ON edge.

When a state of a switch, a sensor, a signal or the like changes from the on state to the off state, the change of the state is defined as the OFF edge.

[A] Overview

Figure 5:
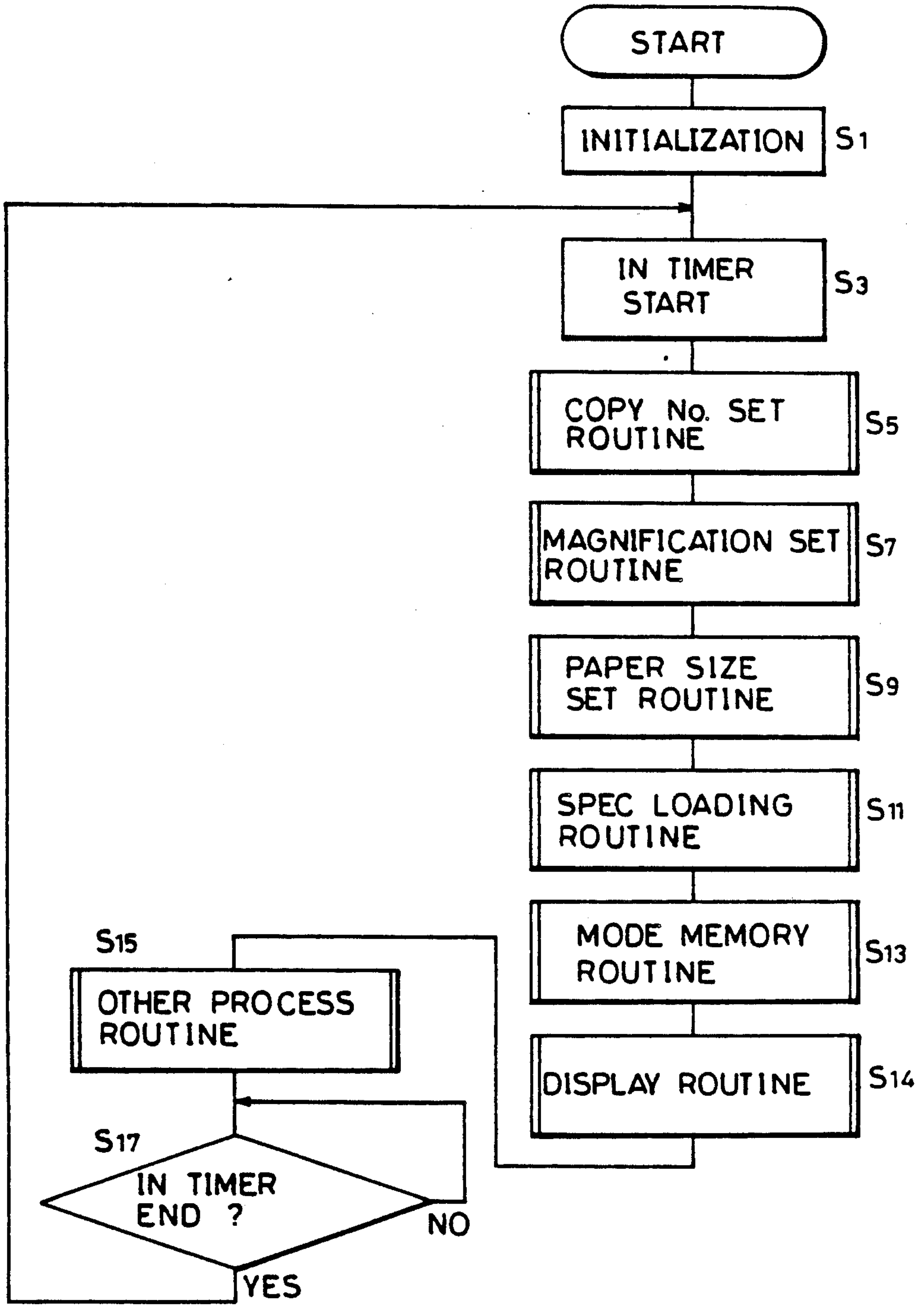
FIG. 5 is a flow chart showing a main routine of processing in a control CPU of the data input apparatus.

FIG. 5 is a flow chart showing a main routine of the CPU constituting the control portion 201.

The control CPU starts processing when the power is turned on, for example. First, the initialization is carried out (S1), and an internal timer for defining a time for 1 routine is set (S3).

Then, respective processes from S5 to S15 are carried out, and when the operation of the internal timer set in the step S3 ends in the step S17, the flow returns to the step S3 to repeat the processing.

(1) S5 (Process for Setting Copy Numbers)

This is a step for setting the number of copies in accordance with an input from the ten keys 80 to 89.

The details of the process will be described later.

(2) S7 (Process for Setting Magnification)

This is a step for setting copying magnification in accordance with an input from the magnification set keys 100 to 103 or from the magnification up and down keys 95 and 96.

The details of the process will be described later.

(3) S9 (Process for Setting Paper Size)

This is a step for setting the size of copy papers in accordance with an input from the paper select key 92. The prepared size of copy papers are A3, B4, A4 and B5.

The details of the process will be described later.

(4) S11 (Process for Loading Specification)

This is a step for reading data of a machine registration card appended to the copying machine into the data input apparatus of the present invention in accordance with an input from the data load key 73.

The details of the process will be described later.

(5) S13 (Mode Memory Process)

This is a step for transferring and writing copy data set by the present apparatus into an operator card in accordance with an input from the data store key 71.

The details of the process will be described later.

(6) S14 (Display Process)

In this process, the number of miss matches of the copy mode data set in the data input apparatus (including the number of copies, copying magnification and the paper size) with the function of the copying machine registered in the data input apparatus is displayed in accordance with the input from the key 74 for respective data.

The details of the process will be described later.

(7) S15 (Other Processes)

In this step, other processes such as error processing and so on are carried out.

The details of the process will be described later.

[B] Description of the Subroutines (1) Copy Number Set Process Routine

Figure 6:
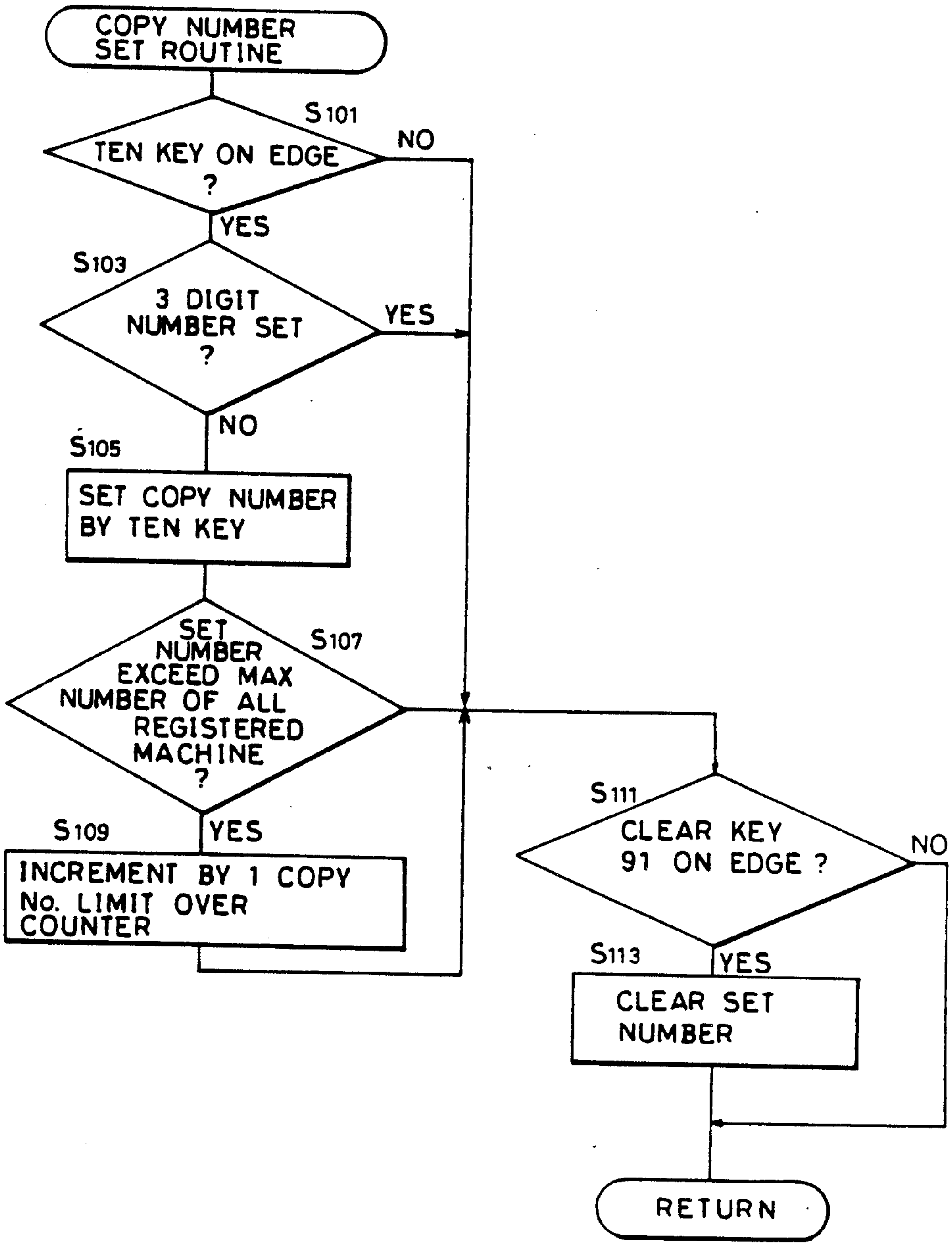
FIG. 6 is a flow chart showing details of a copy number set processing routine of FIG. 5.

FIG. 6 is a flow chart showing the details of the said step S5.

The steps S101 to S105 are to set a numerical value inputted by the ten key which is turned on as a copy number data (S105), in response to an ON edge (S101; YES) of any one of the ten keys 80 to 89. However, if a numerical value of three digits has been set as the copy number data (S103; YES), then the input is neglected. The upper limit of the copy number which can be set by the data input apparatus of the present invention is 999.

If the set copy number is over the maximum copy number among all the copying machines registered in the data input apparatus (S107; YES), a copy number limit over counter is incremented (S109).

Steps S111 to S113 are the steps for clearing the set copy number data (S109), when the ON edge of the clear key 91 is detected (S111; YES).

(2) Magnification Set Process Routine

Figure 7:
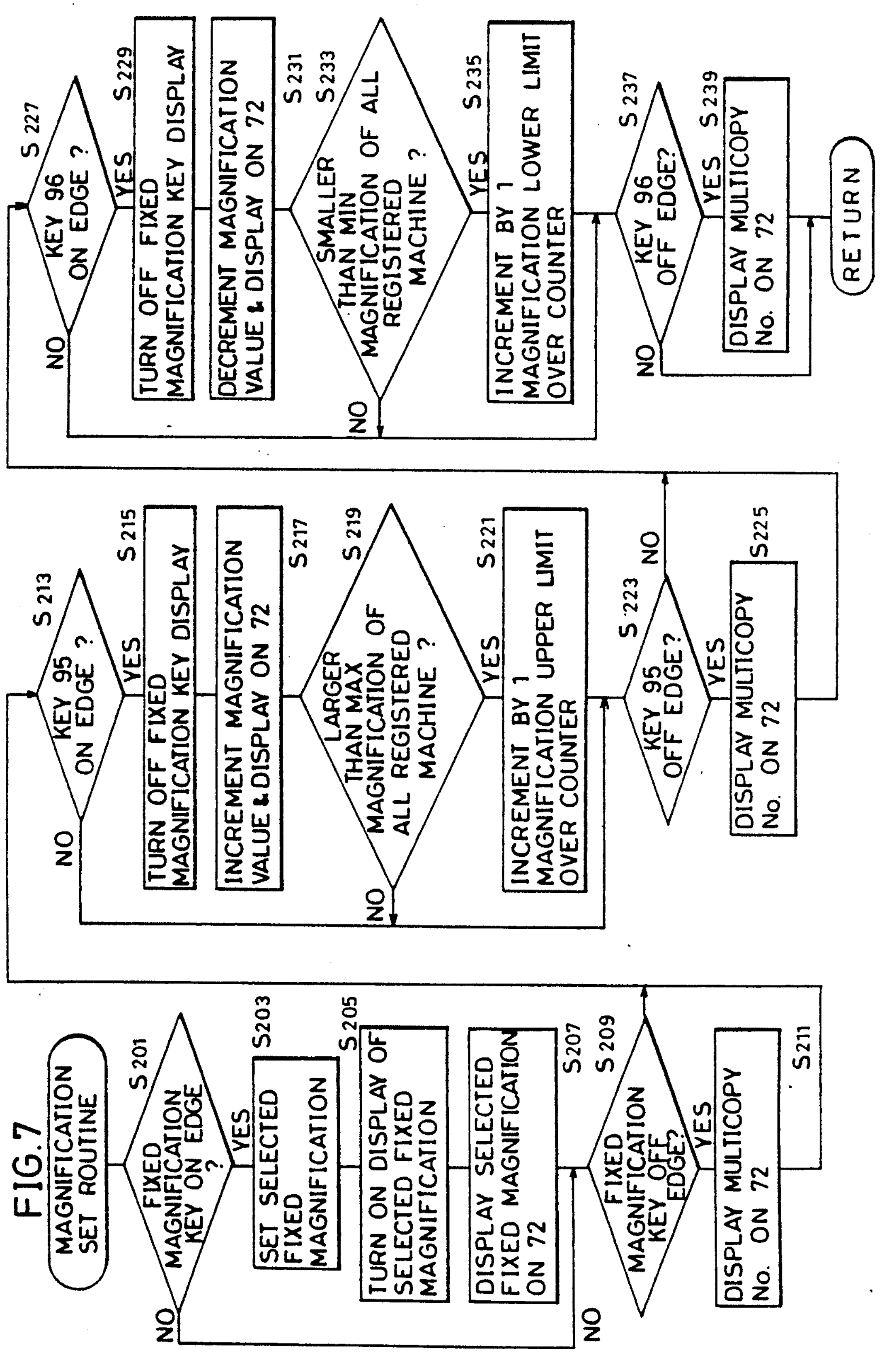
FIG. 7 is a flow chart showing details of a magnification set processing routine of FIG. 5.

FIG. 7 is a flow chart showing the details of the said step S7.

In the steps S201 to S207, responsive to an ON edge (S201; YES) of any one of the fixed magnification select keys 100 to 103, the fixed magnification corresponding to the key which is turned on is set (S203), the magnification display (any one of 101*a* to 103*a*) corresponding to the set fixed magnification is turned on (S205), and the set fixed magnification value is displayed (S207) at a display portion 72.

When the OFF edge of the fixed magnification select key which was turned on in the above described steps is detected (S209; YES), the display on the display portion 72 returns from the copy magnification display to the copy number display (211).

In the steps S213 to S225, an arbitrary magnification is set by the magnification up key 95.

Namely, when the ON edge of the magnification up key 95 is detected (S213; YES), the magnification value data is incremented, and the incremented magnification value is displayed on the display portion 72 (S217). Since it is the step for setting the arbitrary magnification, the fixed magnification display LEDs 100*a* to 103*a* are turned off (S215).

When the said magnification value is larger than the maximum copy magnification among all the copy machine registered to the data input apparatus (S219; YES), the magnification upper limit over counter is incremented (S221).

When the OFF edge of the magnification up key 95 which was turned on is detected (S223; YES), the display on the display portion 72 returns from the copy magnification display to the copy number display (S225).

In the steps S227 to S239 an arbitrary magnification is set in response to on/off of the magnification down key 96. The process carried out through these steps is the same as that of the steps S223 to S225 except that the magnification value is decremented (S231) and that the magnification lower limit over counter is incremented (S235).

(3) Paper Size Set Process Routine

Figure 8:
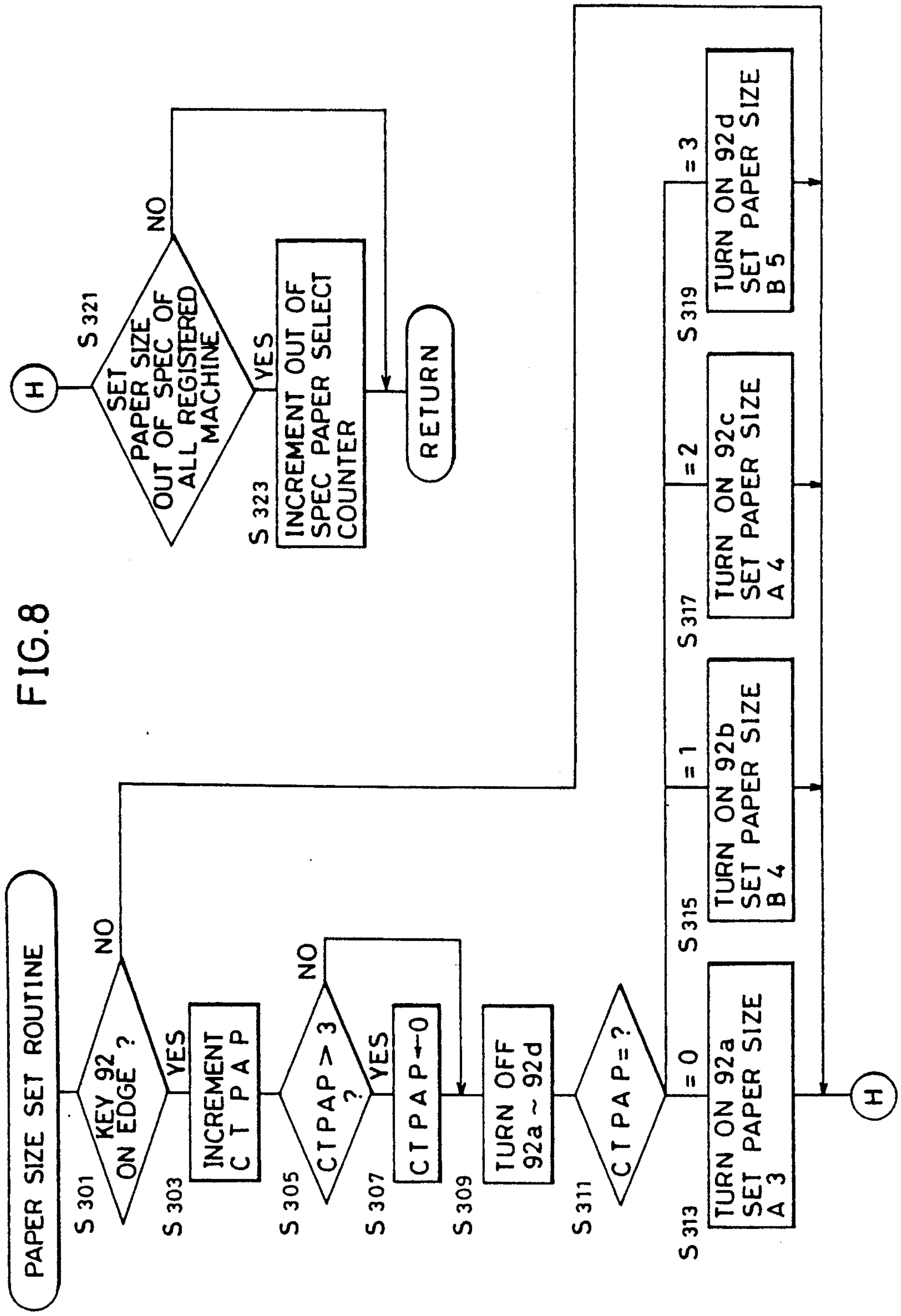
FIG. 8 is a flow chart of a paper size set processing routine of FIG. 5.

FIG. 8 is a flow chart showing the details of the said step S9. In this routine, the paper size of A3, B4, A4 and B5 is rotated in correspondence to turning on/off of the paper select key 92 to be selected and set.

More specifically, on every ON edge of the paper select key 92 (S301; YES), a CTPAP counter corresponding to the paper size (CTPAP=0: A3, 1: B4, 2: A4, 3: B5) is incremented (S303). However, if the value of the counter exceeds 3 as the result of the incrementation (S305; YES), the value of the CTPAP counter is returned to zero (S307).

The paper size is set in correspondence with the said incremented counter value (S311), and the display LED corresponding to the set paper size is turned on (S313, S315, S317 and S319).

If the set paper size is out of the specification of all the copying machines registered in the data input apparatus (S321; YES), an out-of-specification paper select counter is incremented (S323).

Figure 9:
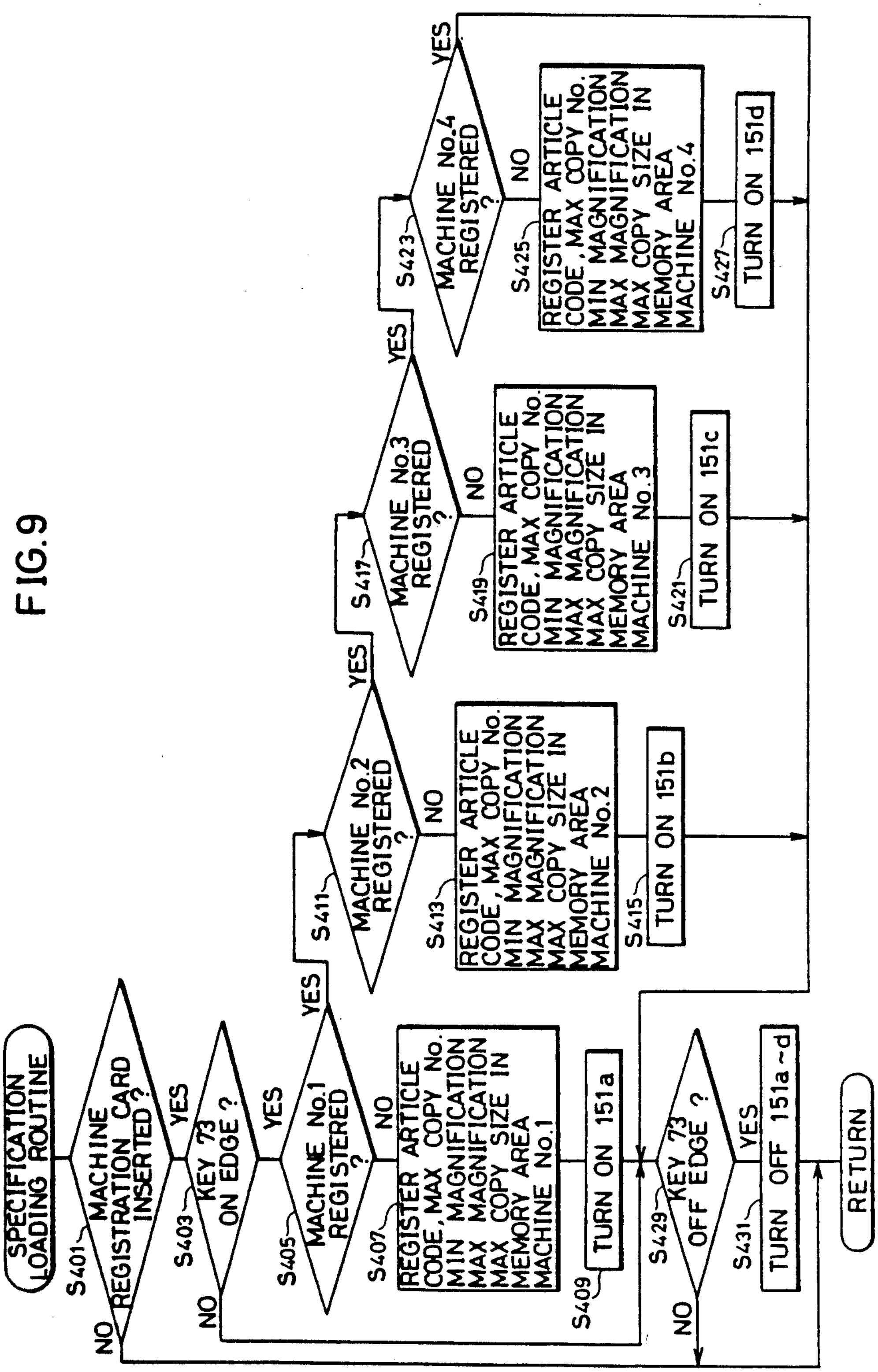
FIG. 9 is a flow chart showing details of a specification loading processing routine of FIG. 5.

(4) FIG. 9 is a flow chart showing the details of the said step S11. When a machine registration card is set in the data input apparatus of the present invention (S401; YES) and an ON edge of the data rod key 73 is detected (S403; YES), the data stored in the said machine registration card is loaded to a prescribed memory area of the data input apparatus.

First, whether there is an available area or not in the function registration area (capable of registering four machine at the most: machine No. 1 to machine No. 4) of the memory of the data input apparatus is determined (S405, S411, S417 and S423).

If there is an available area (S405; NO or S411; NO, or S417; NO or S423; NO), the data in association with the article code, the maximum copy number, the minimum copy magnification, the maximum copy magnification, and the maximum copy paper size registered in the said machine registration card are registered in the said function registering area (S407, S413, S419 and S425).

In order to indicate which of the registration areas is employed for registering the said data, the corresponding display LED (any one of the LEDs 151*a* to 151*d*) is turned on (S409, S415, S421 and S427).

When an OFF edge of the data load key 73 is detected (S429; YES), the said display LED which was turned on is turned off (S431). Namely, each of the displays LEDs 151*a* to 151*d* is on only when the data load key 73 is being pressed.

(5) Data Memory Process Routine

Figure 10:
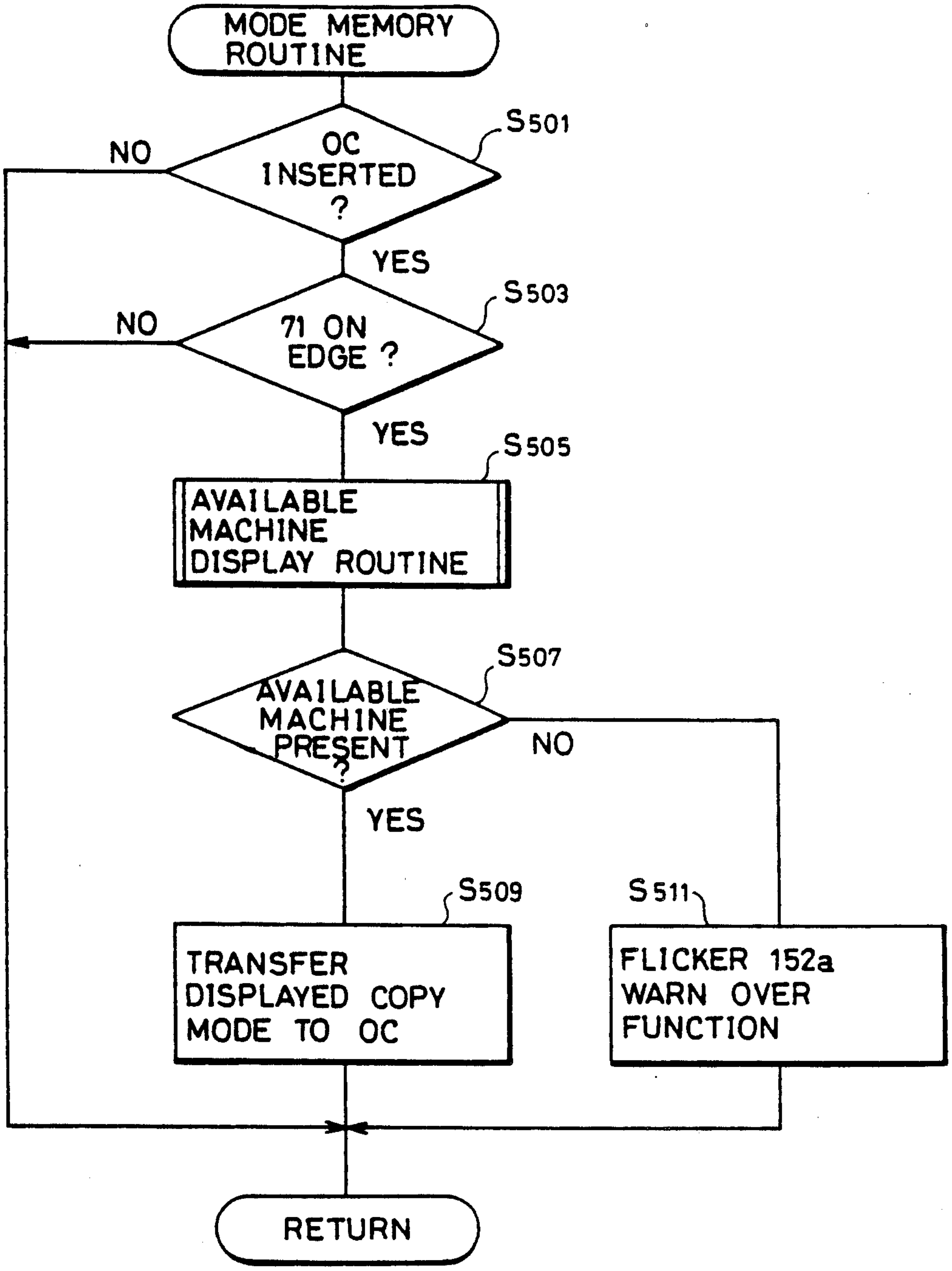
FIG. 10 is a flow chart showing details of a mode memory processing routine of FIG. 5.

FIG. 10 is a flow chart showing the details of the said step S13. When an operator card is set in the data input apparatus of the present invention (S501; YES) and an ON edge of the data store key 71 is detected (S503; YES), first, an available machine display routine (which will be described later) is called (S505), and whether there is an available copying machine for the operation mode to be saved among the copying machine registered in the data input apparatus or not is displayed.

When there is an available copying machine (S507; YES), the data of the copying conditions, which are set by the data input apparatus and are displayed, are transferred to the operator card (S509).

If there is no available copying machine (S507; NO) an over specification warning display LED 152*a* is flickered to give a warning (S511).

Figure 11:
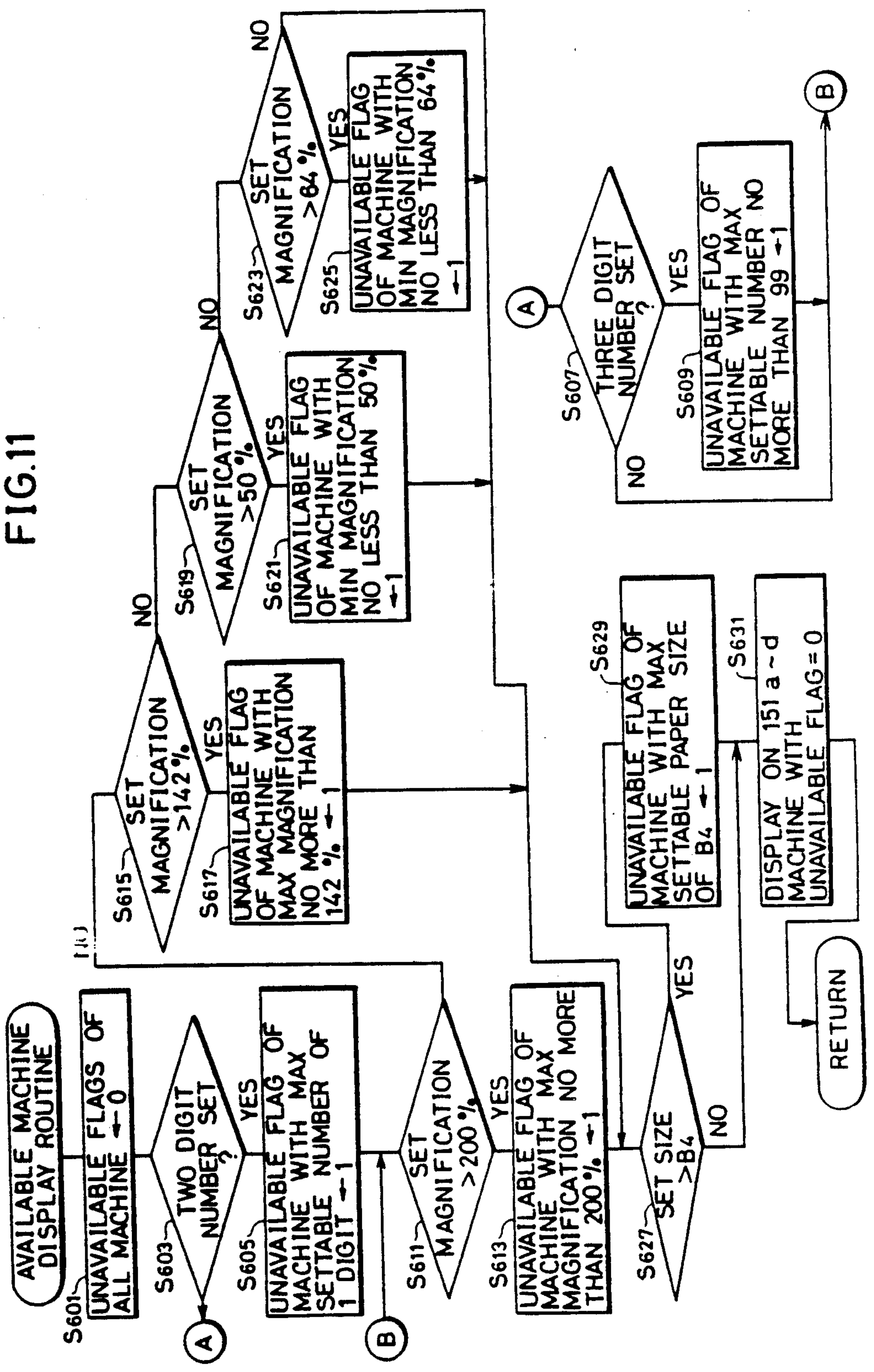
FIG. 11 is a flow chart showing details of an available machine display processing routine of FIG. 10.

FIG. 11 is a flow chart showing the details of the said step S505 (available machine display routine).

First, various unavailable flags set in correspondence with respective copying machines registered as machine numbers No. 1 to No. 4 are all set off (S601) and processes for respective modes are carried out.

In the steps S603 to S609, a process in association with the number of copies is carried out.

More specifically, if the number of copies set in the data input apparatus (the number of copies to be saved in the operator card) is a two digits number (S603; YES), an unavailable flag is set on for a copying machine in which the largest settable number of copies (maximum copy number) is a number of one digit (S605). Similarly, when the said copy number is three digits (S607; YES), an unavailable flag is set on for a copy machine whose maximum copy number is a number of two digits or less (S609).

In the steps S611 to S625, a process in association with the copying magnification is carried out.

More specifically, when the copying magnification set in the data input apparatus (the copying magnification to be saved in the operator card) is over 200% (S611; YES) then an unavailable flag is set on for a copying machine in which the largest settable copying magnification (the maximum copy magnification) is less than 200% (S613). Similarly, when the said copying magnification is over 142% (S615: YES), when it is smaller than 50% (S619; YES), or when it is smaller than 64% (S623; YES), the corresponding flag is set on (S617, S621 and S625).

In the steps S627 to S629, a process in association with the paper size is carried out.

More specifically, when the paper size set in the data input apparatus (the paper size to be saved in the operator card) is larger than the size of B4 (S627; YES, for example when A3 is set), an unavailable flag is set on for a copying machine in which the largest paper size which can be set therein is B4 (S629).

After the above described processes, a copying machine on which no unavailable flag is set is displayed by turning on the display LED (anyone of the LEDs 151*a* to 51*d*) corresponding to the said copying machine.

(6) Display Process Routine

Figure 12:
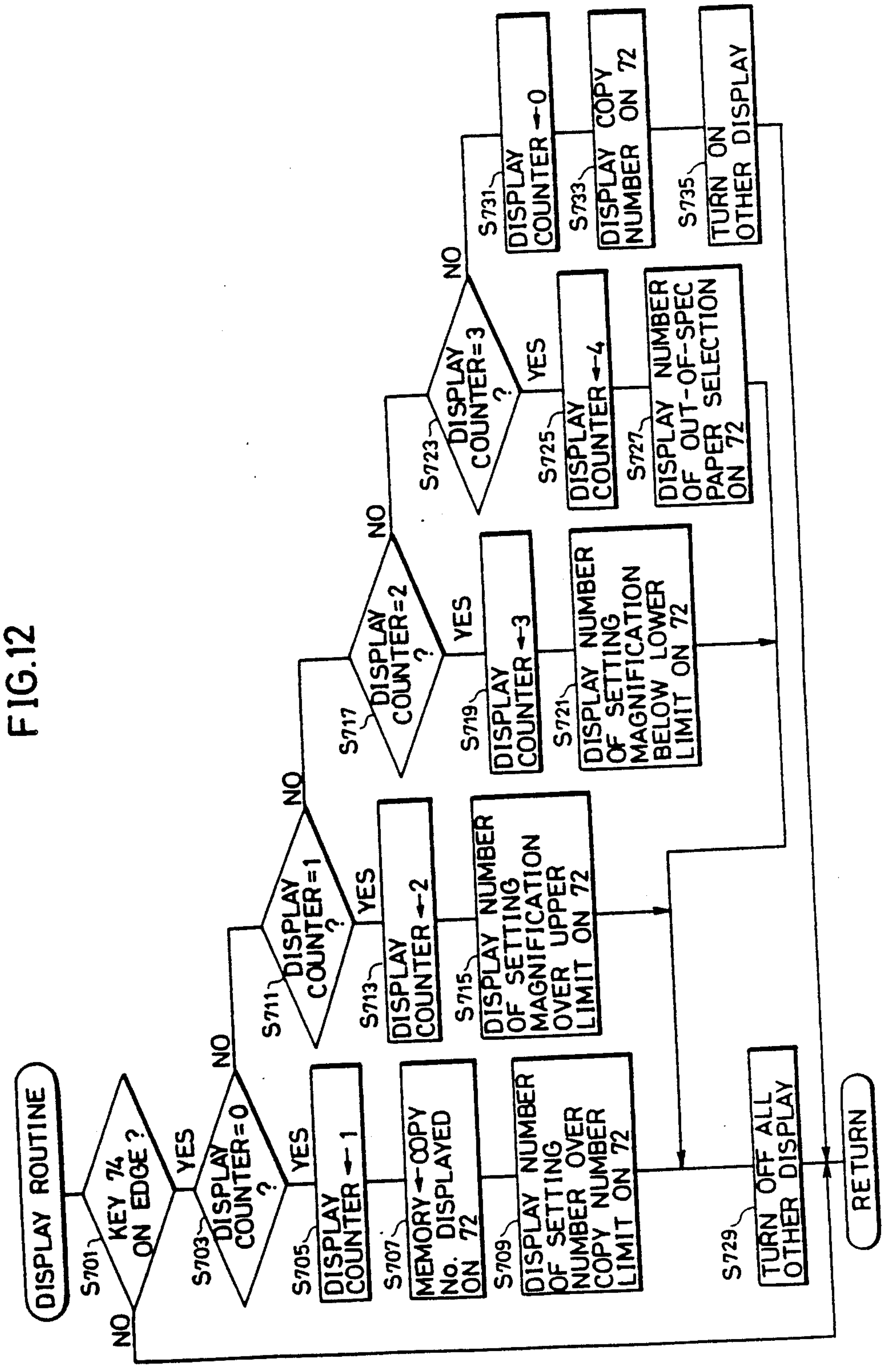
FIG. 12 is a flow chart showing details of a display processing routine of FIG. 5.
Figure 13:
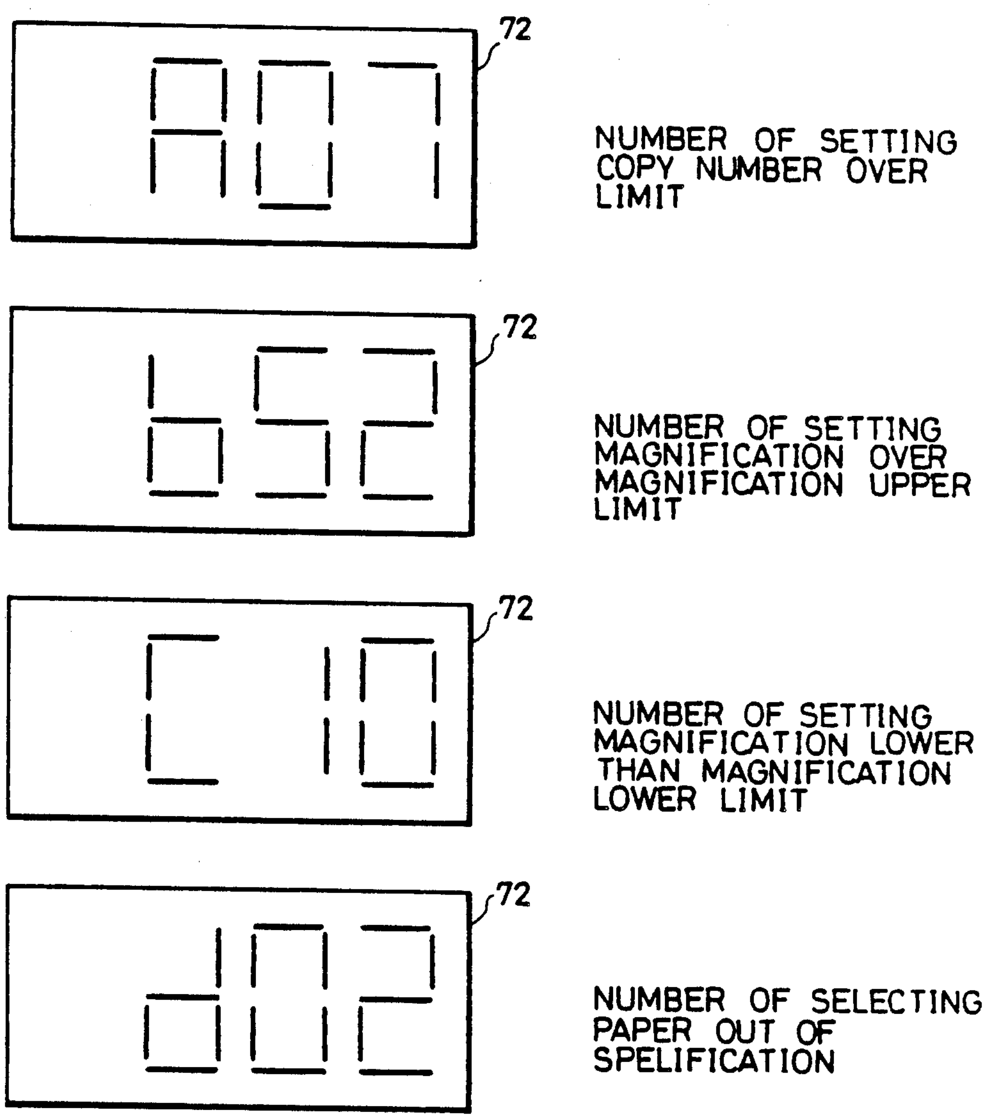
FIG. 13 shows examples of numbers of inputs of control data out of a range of control.

FIG. 12 is a flow chart showing the details of the said step S14 and FIG. 13 illustrates an example of a function display (display in accordance with the present routine) by the display portion 72.

In this routine, the items are rotated successively at every input of the count display request key 74 so as to display the number of setting data beyond the capacity of machines together with the item on the display portion 72.

For example, when the ON edge of the count display request key 74 is detected (S701; YES) and the display counter is at 0 (initial value) (S703; YES), then the display counter is set at 1 (S705), and at the same time, the number of copies displayed on the display portion 72 is saved in the memory (S707). The number of setting a copy number over the capacity (see paper number set process routine; S109) is displayed on the display portion 72 (S709). As for a method of display, "A" may be displayed on the left hand of the numerical value (at the highest digit) as an indication of "the number of setting copy number beyond capacity", as shown in FIG. 13.

In the same figure, the display is "A07", which means that a copy number which is beyond the capacity of the machine is set for seven times.

Thereafter other displays are all turned off in order to make clear that the display is the number of miss matched setting, that is, the number of settings beyond the set functions of the copying machines registered to the data input apparatus and to attract attention to the display (S729). Thereafter the flow returns to the main routine.

In the similar manner, when an ON edge cf the count display request key 74 is detected (S701; YES), the following contents are respectively displayed on the display portion 72 corresponding to the respective cases. Namely, when the display counter is 1 (S711; YES), the number of settings of the magnification over the upper limit is displayed (see magnification set process routine; S221); when the display counter is 2 (S717; YES), the number of settings of the magnification lower than the lower limit is displayed (see the magnification set process routine; S235); and when the display counter is 3 (S723; YES), the number of setting the out-of-specification paper selection is displayed on the display portion 72 (see the paper size set process routine; (S323) (S711 to S727), and the flow proceeds to the step S729.

The display of the number of settings of the magnification over the upper limit is accompanied with a letter b at the highest digit, the display of the number of settings of the magnification lower than the lower limit is accompanied with the letter C at the highest digit, and the display of the number of the out-of-specification paper selection is accompanied with the letter d at the highest digit, respectively (see FIG. 13).

If the display counter is set at 4 (S723; NO), the display counter is returned to 0, which is the initial value (S731), and the display portion 72 again displays the number of copies (S733), and other displays are turned on again (S735).

The data input apparatus of the present embodiment is controlled in the above described manner.

Although not mentioned in the foregoing, the data such as the color of copies, the amount of exposure, the presence/absence of optional devices such as ADF (Automatic Document Feeder) or a sorter can be handled in the similar manner.

(4) Second Embodiment

The second embodiment will be described in the following. The data input apparatus of the second embodiment shown in FIG. 14 further comprises a machine select key 151 for designating a copying machine which the operator desires to use. In the input apparatus of the second embodiment, whether the designated copying machine is capable of carrying out copying operation under the conditions desired by the operator or not is determined, and if it is incapable, a warning is given.

The process of control of the second embodiment will be hereinafter described with reference to flow charts. Portions overlapping with the first embodiment will be omitted.

(Description of the Operation Panel)

Figure 14:
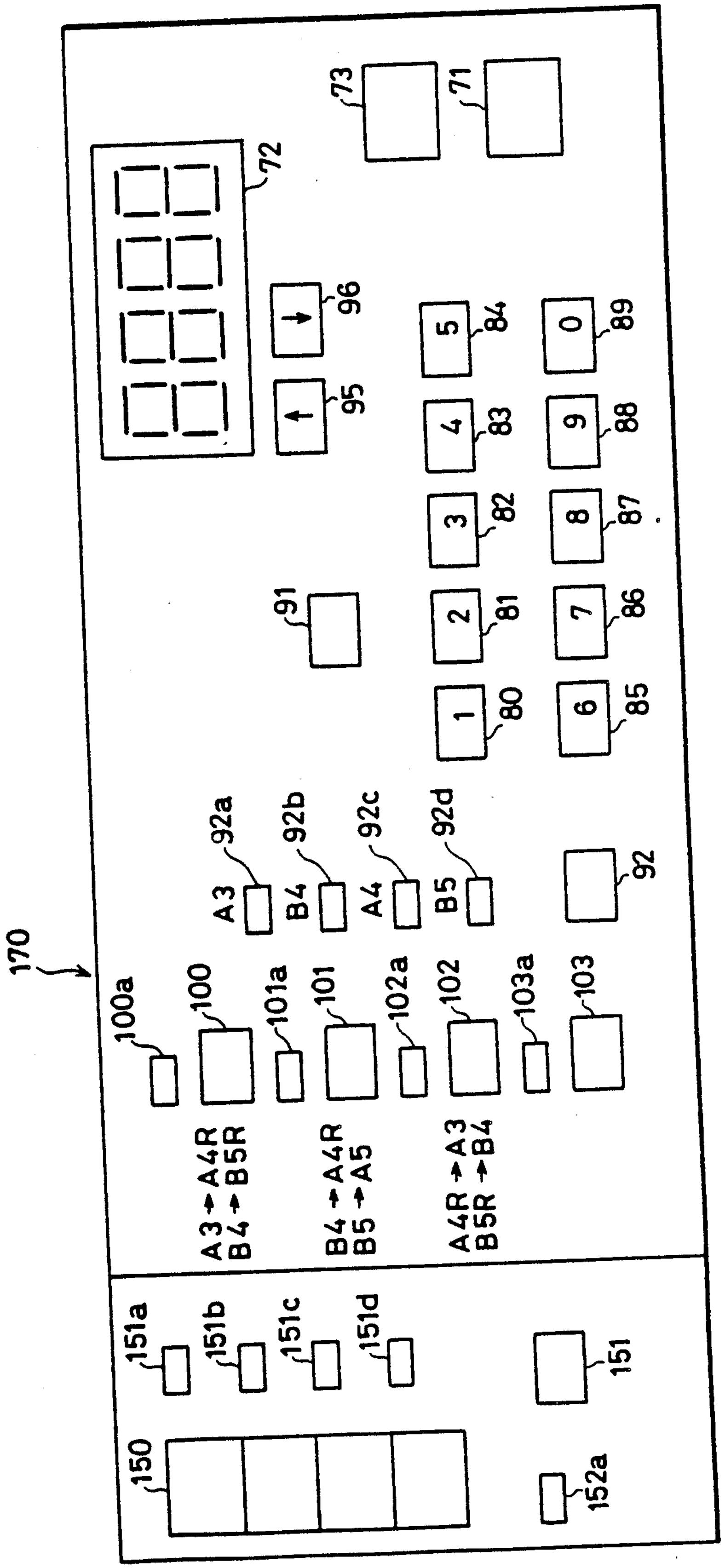
FIG. 14 illustrates an operation panel of a data input apparatus in accordance with a second embodiment.

FIG. 14 shows the details of the operation panel 170 of the second embodiment. In addition t the elements arranged on the operation panel of the first embodiment, a copying machines select key 151 is provided for selecting a copying machines to which the data ar to be stored.

(Description of the Control Portion)

The block diagram of FIG. 4 illustrating the control portion of the data input apparatus is common to the present embodiment. However, some control signals are different as will be described in the following.

Namely, to the control portion 201, inputted are signals from various key switches shown in FIG. 14 (the ten key group 80 to 89, the fixed magnification keys 100 to 103, the copy paper select key 92, the clear key 91, the magnification up key 95, the magnification down key 96, the data store key 71, the data load key 73 and the copy machine select key 151). From the control portion 201 outputted are control signals to the driving circuits of various display elements (the segment numerical display portion 72, the paper size display LEDs 92*a* to 92*d*, the magnification display LEDs 100*a* to 103*a*, the machine display LEDs 151*a* to 151*d* and a warning display LED 152*a*).

The operation of the control CPU of the present embodiment will be described in the following.

[A] Overview

Figure 15:
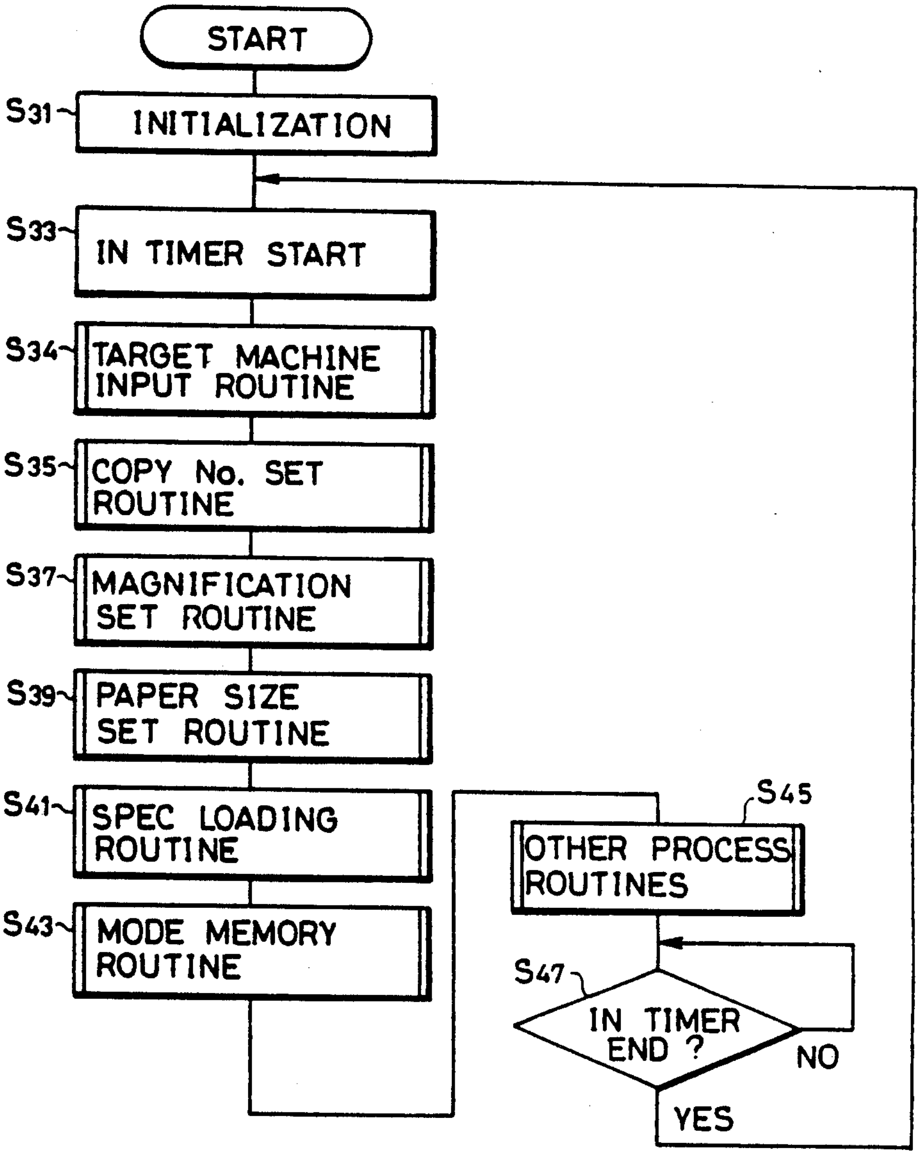
FIG. 15 is a flow chart showing a main routine of the processing of a control CPU of the data input apparatus in accordance with the second embodiment.

FIG. 15 is a flow chart showing a main routine of the processes in the second embodiment.

The control CPU starts operation when the power is turned on, for example, first initialization is carried out (S31), and an internal timer for defining a time for 1 routine is set (S33).

Thereafter, respective processes of the steps S34 to S45 are carried out, and when the operation of the internal timer set in the step S33 ends in the step S47, the flow returns to the step S33 to repeat the operation.

[B] Description of the Sub Routine (1) Target Machine Input Process Routine

Figure 16:
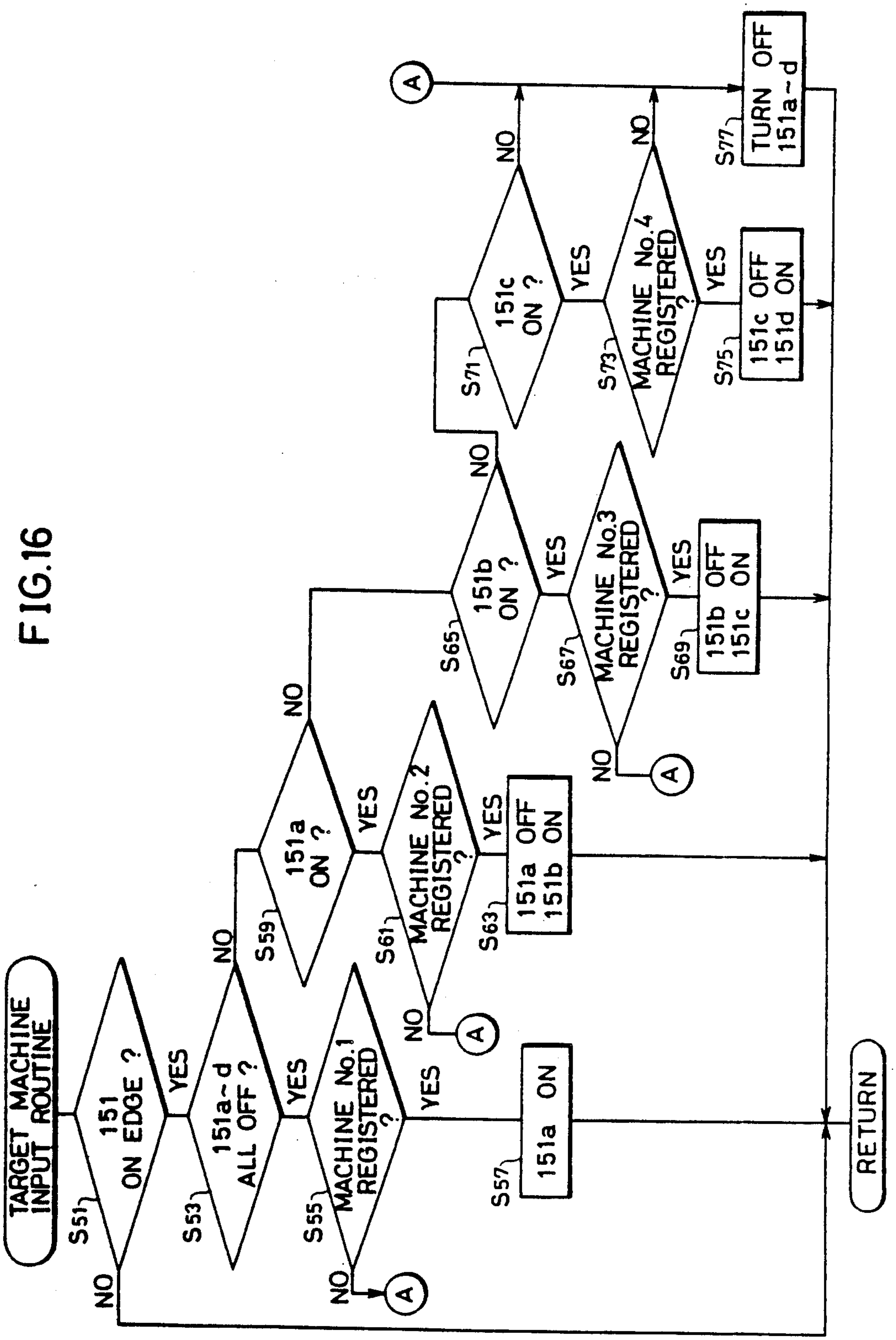
FIG. 16 is a flow chart showing details of a target machine input processing routine of FIG. 15.

FIG. 16 is a flow chart showing the details of the said step S34.

In this routine, copying machines whose functions are registered in the data input apparatus are successively rotated to be selected at every ON edge of the copying machine select key 151 (S51; YES).

For example, when the ON edge of the copying machine select key 151 is detected (S51; YES) and all of the copying machine select display LEDs 151*a* to 151*d* are off, in other words, when no copying machine is designated as the object of the mode data saving in the operator card (S53; YES), then a copying machine registered as the machine number No. 1 is selected as the objective copying machine (S57), provided that the functions of a copying machine are registered in the function registering memory area of No. 1 described in association with the step S405 (S55; YES). When the said copying machine is selected, the copying machine select display LED 151*a* is turned on (S57).

Meanwhile, when the ON edge of the copying machine select key 151 is detected (S51; YES) and the copying machine select display LED 151*a* is on, in other words, when a copying machine registered as the machine number No. 1 is selected as the objective copying machine for the data save in the operator card (S53; NO, S59; YES), then a copying machine registered in the machine number No. 2 is selected as the objective copying machine (S63) provided that functions of a copying machine are registered in the function registering memory area of No. 2 (S61; YES).

When the ON edge of the copying machine select key 151 is detected (S51; YES) and the copying select display LED 151*b* or 151*c* is on, the same operation will be carried out (S56 to S75).

Meanwhile, when the copying machine select display LED 151*d* is on and it is determined that no copying machine is registered in the function registering area of the corresponding machine number in the steps S55, S61, S67 and S73, then the copying machine select display LEDs 151*a* to 151*d* are all turned off, and the flow returns to a state in which no copying machine is selected (S77).

(2) Copy Number Set Process Routine

Figure 17:
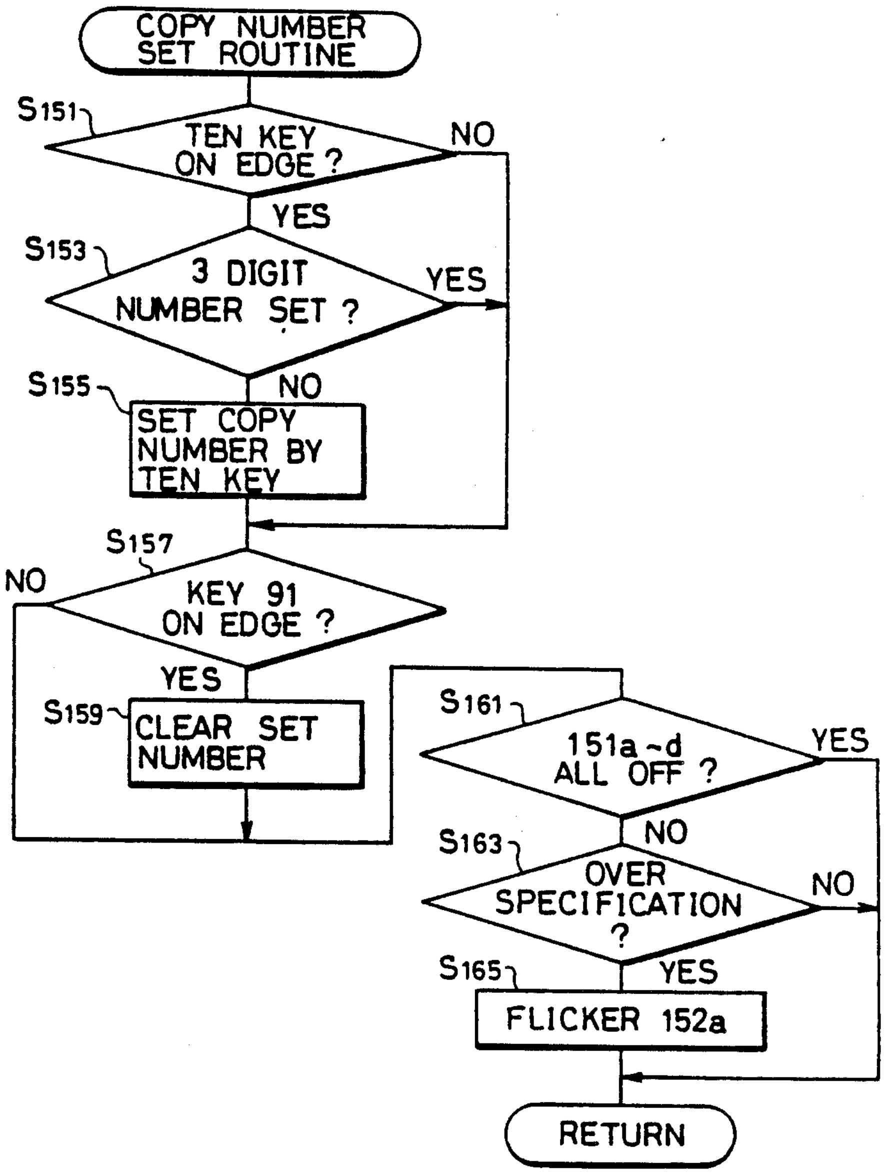
FIG. 17 is a flow chart showing a copy number set processing routine of FIG. 15.

FIG. 17 is a flow chart showing the details of the said step S35.

In the steps S151 to S155, responsive to an ON edge of any one of the ten keys 80 to 89 (S151; YES), the number inputted by the ten key which was turned on is set at the copy number data (S155). However, if a numeral of three digits has been set as the copy number data (S153; YES), the input is neglected Namely, the upper limit of the copy number which can be set in the data input apparatus is 999.

In the steps S157 to S159, the set copy number data is cleared (S159) provided that an ON edge of the clear key 91 is detected (S157; YES).

Meanwhile, when not all of the copying machine select display LEDs 151*a* to 151*d* are off, in other words, at least one of the copying machine select display LEDs 151*a* to 151*d* is on, and the said objective copying machine is selected (S161; NO), then it is determined whether the copy number set in the step S155 exceeds the number of copies which can be set in the selected copying machine or not (S163). If it does exceed the minimum copy number (S163; YES), an over specification warning display LED 152*a* is flickered to give a warning (S165).

(3) Magnification Set Process Routine

Figure 18:
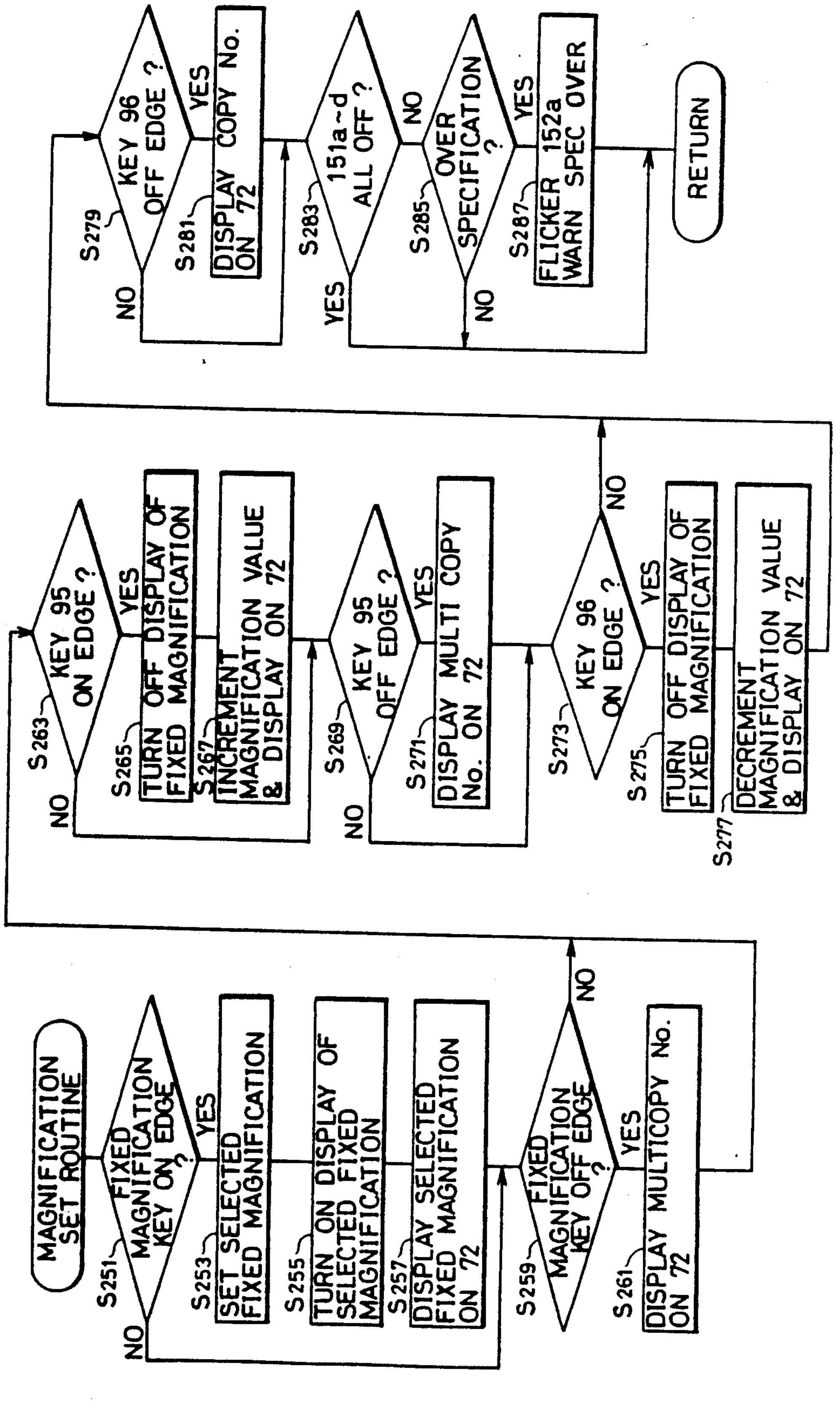
FIG. 18 is a flow chart showing details of a magnification set processing routine of FIG. 15.

FIG. 18 is a flow chart showing the details of the said step S37.

In the steps S251 to S257, responsive to an ON edge of any one of the fixed magnification select keys 100 to 103 (S251; YES), a fixed magnification corresponding to the key which was turned on is set (S253), the magnification display (any one of 101*a* to 103*a*) corresponding to the set fixed magnification is turned on (S255) and the set fixed magnification value is displayed on the display portion 72 (S257).

When an OFF edge of the fixed magnification select key which was turned on is detected (S259; YES), the display on the display portion 72 returns from the copy magnification display to the copy number display (S261).

In the steps S263 to S271, an arbitrary magnification is set by means of the magnification up key 95.

More specifically, when an ON edge of the magnification up key 95 is detected (S263; YES), the magnification value data is incremented, and the incremented magnification value is displayed on the display portion 72 (S267). Since it is the setting of an arbitrary magnification, the fixed magnification display LEDs 100*a* to 103*a* are turned off (S265).

When an OFF edge of the magnification up key 95 which was turned on is detected (S269; YES), the display on the display portion 72 returns from the copy magnification display to the copy number display (S271).

In the steps S273 to S281, an arbitrary magnification is set in response to the turning on/off of the magnification down key 96. The process is the same as that in the steps S263 to S271 except that the magnification value is decremented (S277).

Meanwhile, when not all of the copying machine select display LEDs 151*a* to 151*d* are off, in other words, at least one of the copying machine select display LEDs 151*a* to 151*d* is on, and the said objective copying machine is selected (283; NO), then whether the copy magnification value set in the said steps S253, S267, S277 is in the range of the copy magnification value which can be set by the selected copying machine or not is determined (S285). If the set copying magnification value is out of the range (S285; YES), then an over specification warning display LED 152*a* is flickered to give a warning (S287).

(4) Paper Size Set Process Routine

Figure 19:
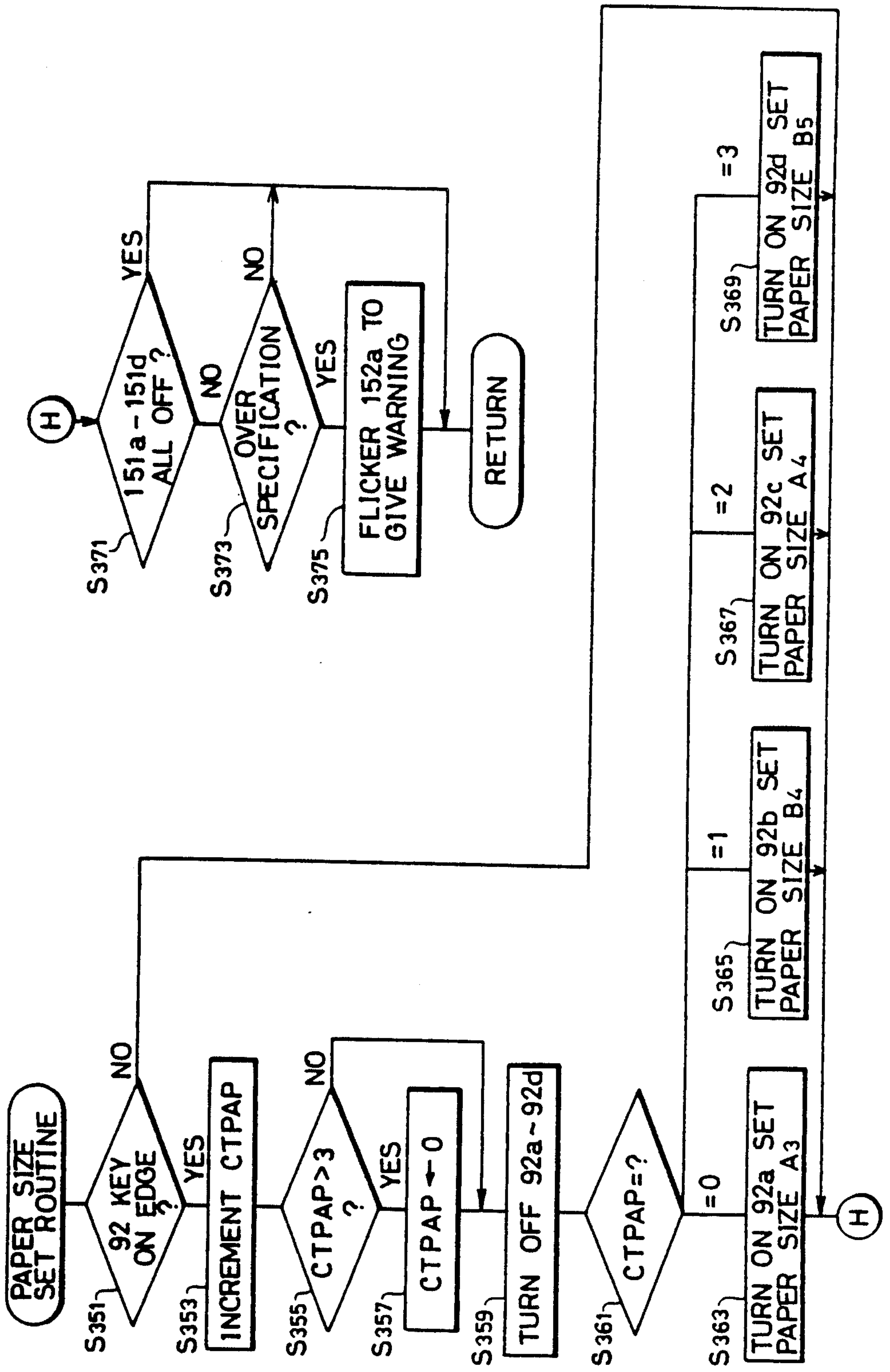
FIG. 19 is a flow chart showing details of a paper size set processing routine of FIG. 15.

FIG. 19 is a flow chart showing the details of the said step S39. In this routine, the paper sizes of A3, B4, A4 and B5 are successively rotated in response to the turning on/off of the paper select key 92 to be selected and set.

More specifically, a CTPAP counter corresponding to the paper size (CTPAP=0: A3, 1: B4, 2: A4, 3: B5) is incremented (S353) at every ON edge of the paper select key 92 (S351; YES). However, as the result of incrementation, when the counter value exceeds 3 (S355; YES), the value of the CTPAP counter is returned to 0 (S357).

Further, the paper size is set in accordance with the said incremented counter value (S361) and the display LED corresponding to the set paper size is turned on (S363, S365, S367 and S369).

Now, when not all of the copying machine select display LEDs 151*a* to 151*d* are off, in other words, any one of the copying machine select display LEDs 151*a* to 151*d* is on, and the said objective copying machine is selected (S371; NO), whether the paper size set in the said steps S313, S315, S317 and S319 is in the range of the paper size which can be set by the said selected copying machine or not is determined (S373). If the paper size is out of the range (S373; YES), then an over specification warning display LED 152*a* is flickered to give a warning (S375).

(5) Specification Loading Process Routine

Since the content of this routine is the same as that of the first embodiment, the description thereof will be omitted.

(6) Mode Memory Process Routine

Figure 20:
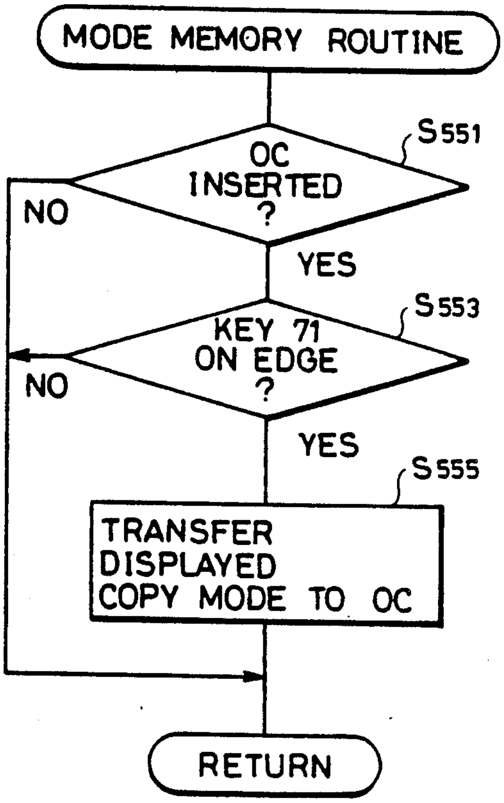
FIG. 20 is a flow chart showing details of a mode memory processing routine of FIG. 15.

FIG. 20 is a flow chart showing the details of the said step S43.

When an ON edge of the data store key 71 is detected (S553; YES) with the operator card set in the data input apparatus (S551; YES), the data of the operation conditions set and displayed by the data input apparatus are transferred to the operator card (S505).

The control of the data input apparatus is carried out in the above described manner.

In short, according to the present invention, a data input apparatus for writing data into a memory medium such as an IC card and for controlling machines such as copying machines by means of the data comprises a memory for storing in advance a prescribed control range which can be set by the machine to be controlled, an operation panel for inputting desired control range, a comparing portion for comparing the settable prescribed control range and the desired control range, and a recording portion for recording the control range of the machine on the memory medium. When the desired control range is out of the prescribed control range, the data input apparatus does not record the desired control range on the memory medium. Consequently, a data input apparatus can be provided in which unnecessary control data, under which a machine such as a copying machine can not operate, are not inputted.

A method for controlling the data input apparatus in accordance with the present invention comprises the steps of inputting a settable prescribed control range of a machine to which the recording medium is attached, inputting the desired control range, determining whether the desired control range is in the prescribed control range, and recording the desired control range on the recording medium only when the desired range is in the prescribed range. Therefore, in a machine such as a copying machine, a method of controlling a data input apparatus can be provided in which the control range under which the machine cannot operate is not inputted.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A data input apparatus for storing data for controlling a machine and for inputting said data to a memory medium which can be attached to and detached from said machine and said apparatus, comprising:

memory means located in said data input apparatus for storing capacity data representing capacity of said machine to which said memory medium is attached and for storing desired control data;

inputting means for inputting said capacity data and said desired control data to said memory means;

determining means for determining by said capacity data and said desired control data whether said machine can be operated under said desired control data or not;

connector means, located in said data input apparatus, to which said memory medium is removably connected; and recording means for recording said desired control data on said memory medium via said connector means when it is determined that the machine can be operated and when said memory medium is connected to said connector means.

2. A data input apparatus according to claim 1, further comprising:

warning means for giving a warning when said machine can not be operated under said desired control data.

3. A data input apparatus according to claim 1, further comprising:

a second memory medium which can be removably connected to said connector means and stores said capacity data of said machine;

means for detecting whether said second memory medium is attached to said connector means or not; and means for reading said capacity data from said second memory via said connector means and storing said capacity data to said memory means when said second memory medium is attached to said apparatus.

4. A data input apparatus for storing data for controlling machines and for inputting said data to a memory medium which can be attached to and detached from a plurality of types of said machines, wherein said machines operate under conditions set for a plurality of items, and a value in a prescribed range can be selected for each of said items, said apparatus comprising:

memory means located in said data input apparatus for storing range data representing said prescribed range for each of said items of said machines;

inputting means for inputting a desired condition for each of said items;

determining means for determining by said range data and said desired condition whether said desired condition is in said prescribed range or not for each of said items;

connector means, located in said data input apparatus, to which said memory medium is removably connected; and recording means for recording said desired condition on said memory medium via said connector means when it is determined that said desired condition is in said prescribed range and when said memory medium is connected to said connector means.

5. A data input apparatus according to claim 4, further comprising:

a plurality of counting means for each corresponding to each of said items, for counting, when said desired condition exceeds said prescribed range of each of said items, the number of such excess; and display means for displaying said counted values in said plurality of said counting means.

6. A method of controlling a data input apparatus for inputting control data for controlling a machine into a memory medium which can be attached to and detached from said machine, comprising the steps of:

inputting capacity data into said data input apparatus, said capacity data representing capacity of said machine to which said memory medium is attached;

inputting desired control data into said data input apparatus;

determining whether said machine can be operated under said desired control data or not; and when it is determined that the machine can be operated and when said memory medium is attached to said input apparatus, recording said desired control data on said memory medium.

7. A method of controlling a data input apparatus according to claim 6, further comprising the step of:

giving a warning when said machine cannot be operated under said desired control data.

8. A method of controlling a data input apparatus according to claim 6, further comprising the steps of:

incrementing a prescribed counter when said machine is incapable of said operation; and displaying said counted value in response to a display instruction.

9. A method of controlling an input apparatus for inputting operation conditions of a machine into a memory medium which can be attached to and detached from said machine, wherein said machine operates under conditions set for a plurality of items, and a value in a prescribed range can be selected for each of said items, said method comprising the steps of:

inputting into said data input apparatus a desired condition for each of said items of said machine to which said memory medium is attached;

determining whether the desired condition is in said prescribed range or not for each of said items; and when said desired condition is within said prescribed range of each of said items, and when said memory medium is attached to said input apparatus, recording said input desired condition on said memory medium.

10. A method of controlling an input apparatus according to claim 9, further comprising the steps of:

when said desired condition is beyond said prescribed range of each of said items, incrementing a counter corresponding to that item; and displaying a counted value in response to display instructions;

means for detecting whether said second memory medium is attached to said apparatus or not; and means for reading said capacity and storing said capacity to said memory means when said second memory medium is attached to said apparatus.

* * * * *